(12) United States Patent
Matsui et al.

(10) Patent No.: US 7,883,252 B2
(45) Date of Patent: Feb. 8, 2011

(54) DISPLAY DEVICE

(76) Inventors: Hirokazu Matsui, 2-35, Chuo 2-chome, Otsu-shi, Shiga-ken (JP) 520-0043; Shinzo Murase, 270-20, Wanitakagi, Otsu-shi, Shiga-ken (JP) 520-0528

( * ) Notice: Subject to any disclaimer, the term of this patent is extended or adjusted under 35 U.S.C. 154(b) by 190 days.

(21) Appl. No.: 12/190,289

(22) Filed: Aug. 12, 2008

(65) Prior Publication Data

US 2009/0052206 A1    Feb. 26, 2009

(30) Foreign Application Priority Data

Aug. 20, 2007    (JP) .............................. 2007-213752

(51) Int. Cl.
*F21V 7/04* (2006.01)
(52) U.S. Cl. ..................... 362/612; 362/632; 362/560
(58) Field of Classification Search ................ 362/602, 362/606, 612, 632, 633, 97.1, 97.2, 97.3, 362/97.4, 555, 551, 560, 561, 331, 603, 604, 362/559; 40/361, 362, 363, 364, 365, 366, 40/367, 546, 547, 575, 544, 564
See application file for complete search history.

(56) References Cited

U.S. PATENT DOCUMENTS

| | | | | | |
|---|---|---|---|---|---|
| 1,272,547 | A | * | 7/1918 | Singer | .......................... 40/367 |
| 1,380,895 | A | * | 6/1921 | Gilman | ......................... 362/97.4 |
| 3,771,245 | A | * | 11/1973 | Mabrey et al. | ................. 40/367 |
| 4,404,619 | A | * | 9/1983 | Ferguson | ..................... 362/222 |
| 4,691,267 | A | * | 9/1987 | Giesberg | ...................... 362/218 |
| 4,835,661 | A | * | 5/1989 | Fogelberg et al. | .......... 362/97.1 |
| 5,207,495 | A | * | 5/1993 | Ahlstone | ...................... 362/33 |
| 5,301,447 | A | * | 4/1994 | Lotter et al. | .................. 40/603 |
| 6,817,738 | B1 | * | 11/2004 | Winters et al. | .............. 362/368 |

(Continued)

FOREIGN PATENT DOCUMENTS

JP    4306502    10/1992

*Primary Examiner*—Jong-Suk (James) Lee
*Assistant Examiner*—David R Crowe
(74) *Attorney, Agent, or Firm*—Quarles & Brady LLP

(57) ABSTRACT

A wall-mounted display device, which uses a light guiding panel for an LED light source includes display body 1 with an optical panel 11 housed in a box-like optical diffusion case 15 with flanges 14 formed on the periphery of a substrate 13. A reflection case 12 fits in the optical diffusion case 15, which has a U-shaped cross section and flanges 14 formed on the upper and lower ends of the substrate 16. LED light sources 18 are respectively disposed on the right and left flanges 14 of the reflection case 12 to supply incident light into the light guiding panel 11. Frame members 22, each having a U-shaped cross section, fit in the upper and lower ends of the display body 1, respectively. Each U-shaped frame member is securely fixed with a screw 21 inserted through the rear surface of the frame member, in such a way that the screw 21 is not exposed from the front side of the display body. Frame members 20, each having an L-shaped cross section, are respectively fixed on the right and left ends of the display body 1, with a magnet 23. A transparent cover panel 3 is disposed detachably between the frame member 20 and the optical diffusion case 15. Brackets 4 are fastened on the U-shaped frame members with screws 21 to allow wall mounting.

10 Claims, 6 Drawing Sheets

U.S. PATENT DOCUMENTS

| | | | |
|---|---|---|---|
| 7,086,773 B2 * | 8/2006 | Kim et al. ................... 362/621 |
| 7,113,235 B2 * | 9/2006 | Tsukamoto .................. 349/58 |
| 7,384,179 B2 * | 6/2008 | Sakai ........................ 362/632 |
| 7,445,368 B2 * | 11/2008 | Huang et al. ................ 362/609 |
| 7,473,022 B2 * | 1/2009 | Yoo ........................... 362/621 |
| 7,488,105 B2 * | 2/2009 | Kuo ........................... 362/633 |
| 2006/0104090 A1 * | 5/2006 | Lengyel et al. ............. 362/612 |
| 2007/0133222 A1 * | 6/2007 | Watanabe et al. ........... 362/561 |
| 2007/0195551 A1 * | 8/2007 | Shin .......................... 362/612 |

* cited by examiner

DISPLAY DEVICE

CROSS REFERENCES TO RELATED APPLICATIONS

Not Applicable.

STATEMENT REGARDING FEDERALLY SPONSORED RESEARCH

Not Applicable.

BACKGROUND OF THE INVENTION

The present invention relates to a display device in which a positive image film is back illuminated, such as a display panel including a light guiding plate at the forefront thereof. This display device includes a light source unit housing a fluorescent light source in a closed space of a housing, a large number of light guiding panels disposed over the upper surface of said light source unit, and a reflection panel disposed on the back surfaces of the light guiding panels. The light of the fluorescent light source is transmitted from the light incident end surface to the light guiding panel. Due to light guidance according to the light guiding pattern formed on the light guiding panel, a positive print film, disposed on the front surface, is back-illuminated as uniformly as possible and with high brightness. One such display panel is disclosed in Japanese Patent Publication No. 2623028.

The above-mentioned example can function effectively as a display device for advertisement and decoration. However, the housing for the fluorescent lamp is relatively thick and the use of multiple light guiding panels leads to further thickening the housing. As a result, the structure thereof becomes complicated. Moreover, this type of display device is suitable for a stand-alone type display device but it is undesirable for wall-mounting display devices because the housing protrudes from the front/rear side.

SUMMARY OF THE INVENTION

The present invention is made in consideration of such conditions. One object of the present invention is to provide a slim display device having a flat appearance. Moreover, the present invention is to provide, for example, a wall-mounting type or stand-alone type display device that provides back illumination with high brightness.

One embodiment of the present invention includes a display body having a reflection case and an optical diffusion case, fitted in to each other, a light guiding panel sandwiched between them, and LED light sources. To process the ends thereof, frame members are disposed on one or both of opposed ends of the display body. A transparent cover panel is disposed detachably between the frame members. The light guiding panel that leads the incident light from the LED light source back-illuminates a positive print film inserted between the optical diffusion panel and the cover panel on the front surface of the display panel body. That structure is formed to have a total thickness of the display panel body, the frame, and the cover case. As, a result, the innovative display device is relatively thin appears flat.

In another embodiment of the present invention, a display device comprises a display body including a reflection case and a optical diffusion case, fitted to each other, a light guiding panel sandwiched between the reflection panel and the optical diffusion case, and a LED light source disposed on a flange of one of the cases, which confronts a light incident end surface of the light guiding pane, frame members disposed so as to fit in one or both of opposed ends of the display body, and a front cover panel disposed detachably, for covering the illumination surface of the optical diffusion case between the frame members.

In another embodiment, the reflection case is a box-like case while the optical diffusion case has a U-shaped cross section. Such a thoroughly simplified structure provides a compact display body to be housed better and stably. In another embodiment, one of the reflection case and the optical diffusion case of the display body comprises a box-like case which has flanges respectively formed at both opposed ends of a substrate and the other of the reflection case. Moreover, the optical diffusion case has a U-shaped cross section and has flanges formed at one of the opposed ends of the substrate.

In another embodiment, the reflection case has a U-shaped cross section and has the flange protruding from the upper end and the flange protruding from the lower end. The optical diffusion case has a U-shaped cross section and has a flange protruding from the right end and a flange protruding from the left end. In yet another embodiment, one of the reflection case and the optical diffusion case of the display body has upper and lower flanges, each having a U-shaped cross section. Moreover, the other of the reflection case and the optical diffusion case has right and left flanges. LED light sources are respectively disposed on the upper, lower, right, and left flanges.

In a further embodiment, a flat panel fitted in the light guiding panel is used in place of one of the reflection case and the optical diffusion case. One of said reflection case and the optical diffusion case of the display body is fitted in the light guiding panel to form a flat panel. Moreover, the other of the reflection case and the optical diffusion case houses the flat panel and the light guiding panel and has flanges on which LED light sources are disposed.

In a further embodiment, frame members, each having a U-shaped cross section, are used at one set or both sets of opposed ends of the display body. A back erection piece is used to mount the display body with a screw. Preferably, the screw is not exposed through the front of the display device to obtain good appearance. In a further embodiment, the frame member is disposed adjacent at least one of opposed ends of the display body and has a U-shaped cross section; and an erection piece on the rear surface of the frame member and the display body are fastened together with screws, which are inserted through the back surface side thereof but are not exposed on the front side.

In yet another embodiment, the front cover panel is inserted in a gap between the frame on both ends of the display body and the optical diffusion case. Preferably, the front cover panel is inserted between the back surface of the frame member and an illumination surface of the optical diffusion case and is detachable between said frame members vertically or horizontally. Advantageously, the detachable front cover allows the positive print film to be changed quickly and easily.

In other embodiments, a step or groove is formed in a non-light incident end surface of the light guiding panel and stores conductive leads for a LED light source. In still another embodiment, a housing space for storing conductive leads for LED light sources is formed near to a non-light incident end surface of the light guiding panel in the light guiding panel housing case.

Another embodiment can eliminate the trouble of mounting a bracket onto the display body when the display device is a wall-mounting display device to securely mounting the display device on the wall. In this embodiment, a wall-mounting bracket is provided with the frame member integrally or separately.

In addition to the above-mentioned features, another embodiment of the present invention can prevent rain water from invading into an outdoor display device or the display body due to capillary action. This can be accomplished in one embodiment by providing the frame member with a U-shaped cross section; a S-shaped wall mounting bracket is disposed on the back surface of the display body, a back erection piece of the frame member, a display device, and a front erection piece of the wall-mounting bracket are fastened together with screws through the back side thereof, the screws not protruding on the front side. A gap for capillary action prevention is defined between the front erection piece of the wall-mounting bracket and an inner surface of the frame member.

In yet another embodiment, the display device has a display body including a reflection case, an optical diffusion case, being fit in to each other, a light guiding panel sandwiched between the cases, and a LED light source. To process the ends, frame members are disposed on one set or both sets of opposed ends of the display body. A transparent cover panel is detachable between frames. The light guiding panel, which guides incident light from the LED light source, backlights the positive print film, which is inserted between the optical diffusion case and the cover panel on the front surface of the display body. The total thickness of the display body, the frame and the cover case is thinned as much as possible to provide the impression of a flatly designed device. This structure can be used as a wall-mounting or stand-alone type display device, which can provide high brightness back lighting.

In addition to the above-mentioned features, embodiments of the invention can include a box-like reflection case and an optical diffusion case having a U-shaped cross section to simplify the structure and provide a compact display body.

In addition to the above-mentioned features, embodiments of the invention can include one of the reflection case and the optical diffusion case having flanges protruding at the upper and lower ends thereof and has a U-shaped cross section. The other of the reflection case and the optical diffusion case has flanges protruding at the right and left ends thereof and has a U-shaped cross section.

In addition to the above-mentioned features, embodiments of the invention can includes a flat panel overlying the light guiding panel in place of one of the reflection case and the optical diffusion case to simplify the structure and provide a compact display body.

In addition to the above-mentioned features, embodiments of the invention can include a frame member having a U-shaped cross section disposed at one set or both sets of opposed ends of the display body. The back erection piece of the frame member is used to fasten the display body with screws while the screws do not expose on the front erection piece to provide a clean appearance.

In addition to the above-mentioned features, embodiments of the invention can include the front cover panel inserted in the gap between the frame at the ends of the display body and the optical diffusion case and can be removed detachably. This structure allows the positive print film to be exchanged quickly and easily.

Other objects and advantages of the invention will appear from the following description. In the description, reference is made to the accompanying drawings which form a part hereof, and in which there is shown by way of illustration a preferred embodiment of the invention.

Figure 1:
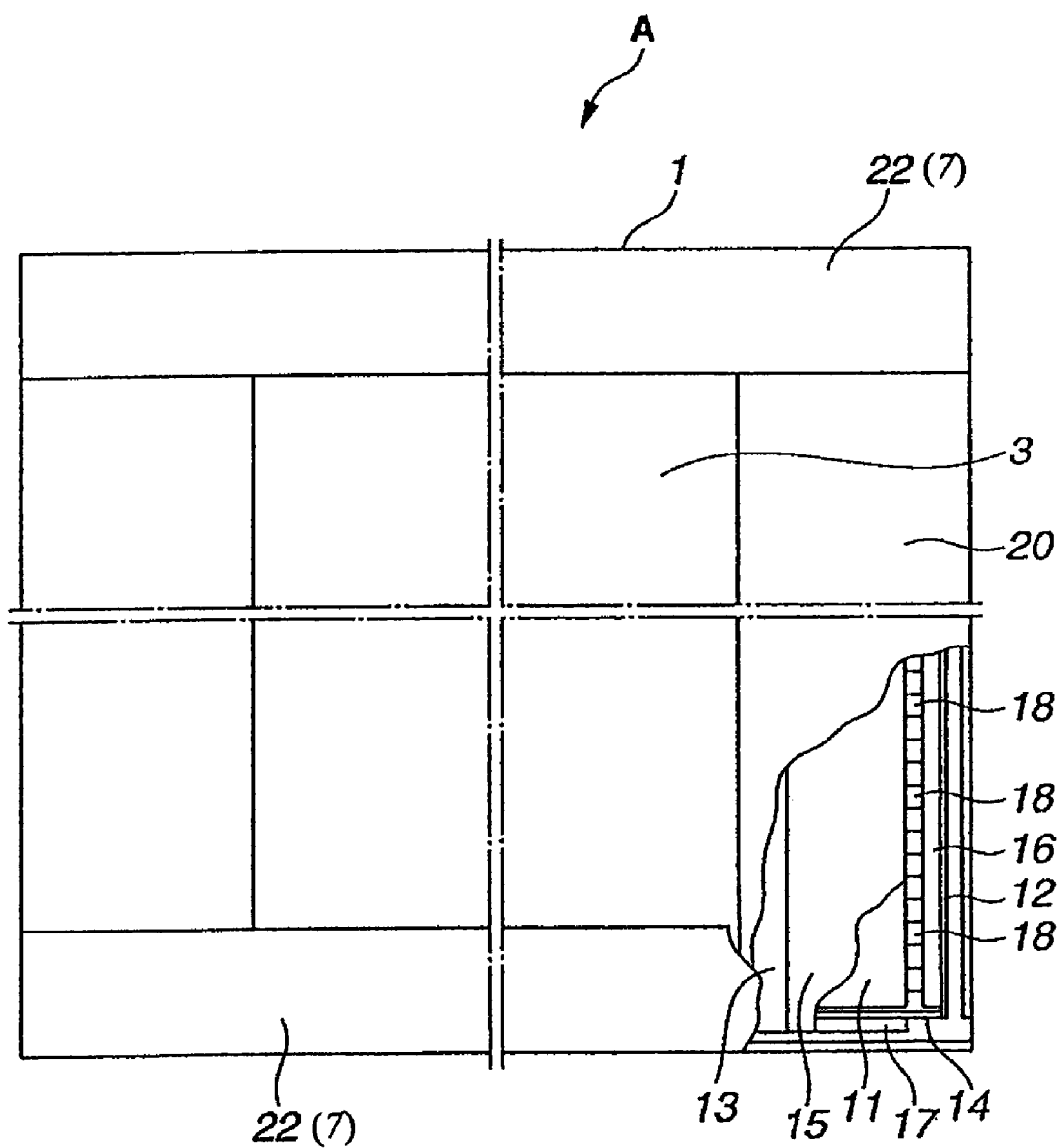
FIG. 1 is a front view illustrating a first embodiment.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

Figure 2:
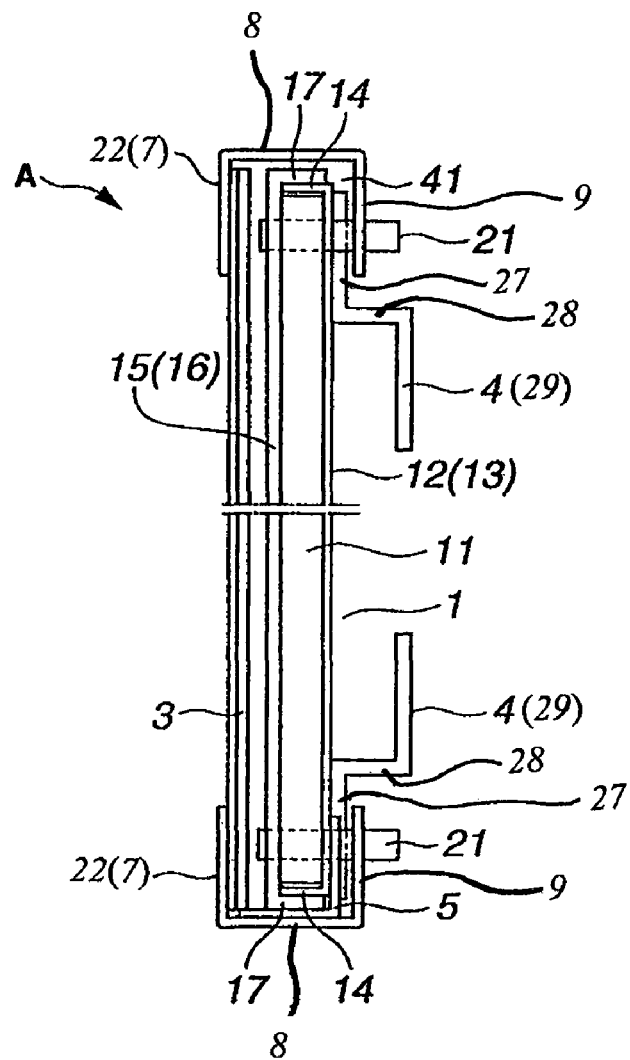
FIG. 2 is a vertical cross-sectional view illustrating the display device shown in FIG. 1
Figure 3:
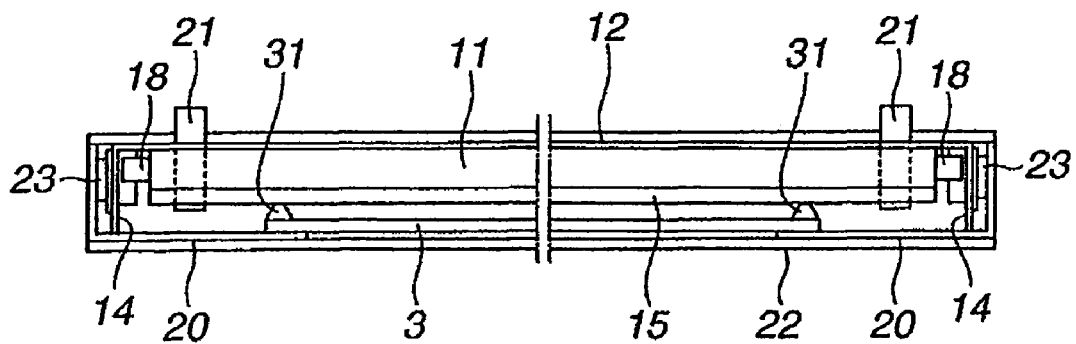
FIG. 3 is a horizontal cross-sectional view illustrating the display device shown in FIG. 1.
Figure 4:
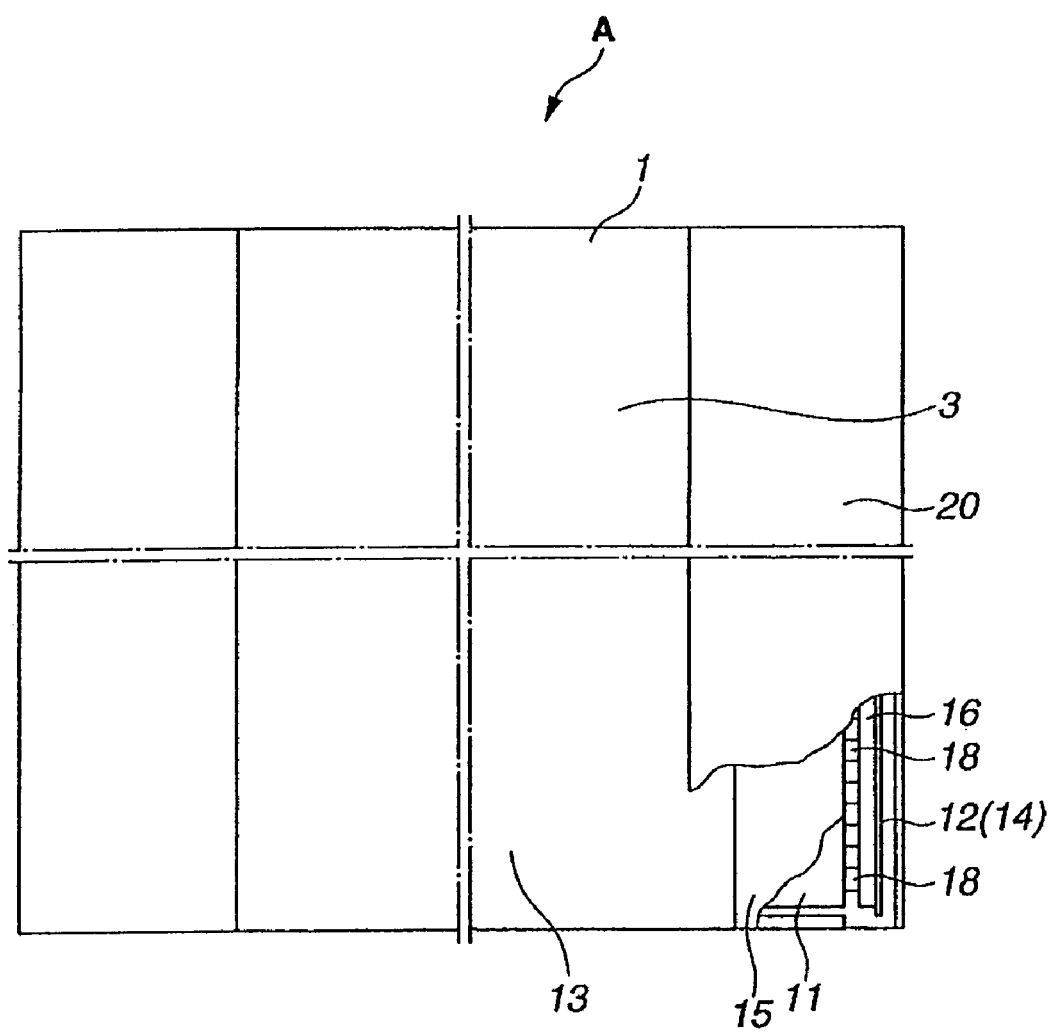
FIG. 4 is a front view illustrating a display device according to another embodiment.
Figure 5:
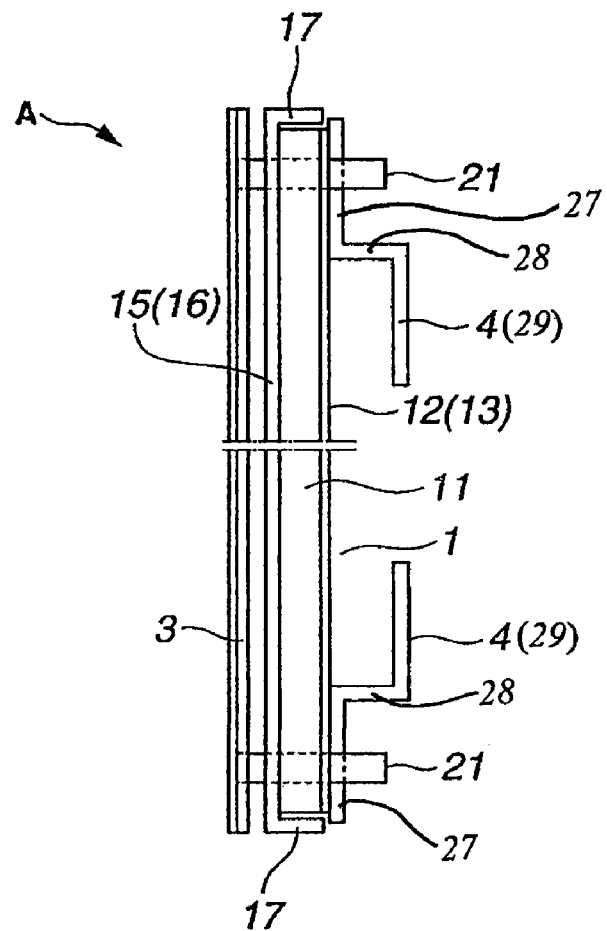
FIG. 5 is a vertical cross-sectional view illustrating the display device shown in FIG. 4.
Figure 6:
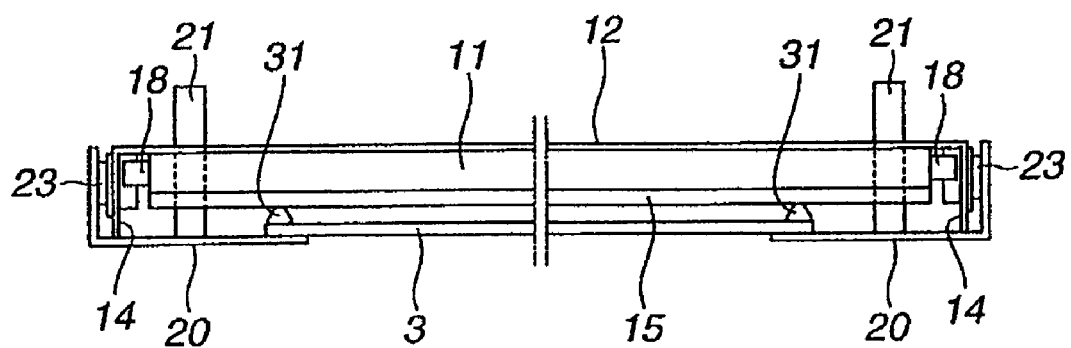
FIG. 6 is a horizontal cross-sectional view illustrating the display device shown in FIG. 4.

The present invention will be explained more specifically by referring the examples shown in the attached drawings. Referring to FIGS. 1 to 3, letter (A) represents the display device. The display device A includes a display body 1, frame members 22, and a front cover panel 3. The display body 1 includes a light guiding panel 11 sandwiched between a reflection case 12 and an optical diffusion case 15, which are fitted in each other, and LED light sources 18. The LED light sources 18 are disposed on the flanges of the cases 12 or 15, confronting the light incident end surfaces of the light guiding panel 11. The frame members 22 are attached on one set or both sets of opposed ends of the display body 1.

The detachable front cover panel 3 covers the illumination surface of the optical diffusion case 15 between the frame members 22. One of the reflection case and the optical diffusion case in the display body 1, or, the reflection case 12, in the present embodiment, is fabricated in a box-like form so as to have the flanges 14 disposed at the opposed ends of a substrate 13. The optical diffusion case 15 has a U-shaped cross section and has flanges 17 formed on opposed ends of a substrate 16. The frame members 22 are disposed on at least one set of opposed ends of the display body, or, on the ends vertically opposed in the present embodiment, and has a U-shaped cross section with erection pieces, or legs, including a front leg 7, a back leg 9, which are joined by a horizontal piece 8. An erection piece 9 of the frame member and the display body 1 are attached with the screws 21, which are inserted from the back side, but preferably do not protrude from the front side. The front cover panel 3 is inserted between the back surface of the erection piece 7 of the frame member 22 and the illumination surface end of the optical diffusion case 15. The cover panel can be detachably removed horizontally and vertically between the frame members 22.

The display device (A) is made of a rectangular or square-type display device, which has, for example, dimensions ranging A2 size to the side or width of 1 m to 2 m or more. The display device is used as a large-sized, so-called wall-mounted, decorative illumination device, for advertisement and decoration, used on the walls of buildings or on outdoor installed signboards. The light guiding panel 11 is a single panel, in which density-changed light guiding patterns are disposed on the back surface of a plate of transparent resin, for example, acrylic resin. That is, the light guiding panel 11 is a seamless single panel in which the light guiding is not blocked. The density changes increasingly from the light incident end surface in the width direction of the light guiding panel toward the center position. This configuration can equalize the brightness over the whole of the light guiding panel 11.

The reflection case 12 and the optical diffusion case 15, which sandwich the light guiding panel 11, are open on the front side and the back side, respectively, so as to match the internal dimension and the external dimension roughly and mutually. The reflection case 12 includes a substrate 13 and flanges 14 extending from the periphery of the substrate 13. The reflection case 12 may be made of a synthetic resin or metal, or of a magnetic substance or steel, for example, in the present embodiment.

The optical diffusion case 15 has a U-shaped cross section and has flanges 17 extending from the opposed upper and lower ends of the substrate 16, in the present embodiment. The substrate 16 is made of a synthetic resin, such as acrylic resin, having an opalescent appearance. As to the synthetic resin, the front or back surface of a transparent substrate having light transparency is roughened to provide a light irregular reflection function. By doing so, the transmission of a light guiding pattern on the light guiding panel 11 is prevented through the use of its irregular light reflection function.

In the present embodiment, the light guiding panel 11 is housed in the box-like reflection case 12. The reflection case 12 is further fitted in the optical diffusion case 15. By doing so, the light guiding panel 11 is sandwiched between the cases 12 and 15. The flanges 14, for example, at the ends in the wide direction of the reflection panel 12, confront the incident ends of the light guiding panel 11. The width of the reflection case 12 is somewhat larger than that of the light guiding panel 11. LED light sources 18 are disposed in the space defined between the incident end and the flange 14. The LED light sources 18 emit the incident light to the light guiding panel 11 to provide the back lighting for a display device.

The LED light source 18 uses an LED unit in which a large number of LED chips are buried at small pitch intervals, for example, in the elongated substrate. The LED units are fixed over the entire length of each flange 14 of the reflection case 12, using a double-stick tape or an adhesive agent. Advantageously, the thickness of the light source is slimmed using the LED unit of high-brightness LED chips. Without increasing the width of the display body 1 or the display (A) or without forming bulges protruding from the front/back surfaces, the LED light source 18 can supply a necessary and sufficient amount of incident light to the light guiding panel 11. Thus, the display device (A) provides a higher intensity of back illumination compared to the prior art.

In the present embodiment, bars having a U-shaped cross section and disposed on the upper and lower end of the display body 1 are used as the frame member 22. Moreover, bars having an L-shaped cross section and disposed on the right and left ends opposed in the width direction of the display body 1 are used as the frame member 20. The frame members 20, 22 are formed of, for example, synthetic resin or metal. The surfaces of them are surface-finished, for example, through paint coating. In the present embodiment, as applied to the reflection case 12, the frame member, or particularly, the frame member 20 having an L-shaped cross section, is made of a magnetic metal, particularly, steel and can be post-mounted with the magnet 23 (to be described later).

The frame members 22 cover respectively part or the whole of the upper and lower ends of the display body 1 in the elongated direction, or the whole of the ends in the present embodiment. Thus, the display body 1 and the cover panel 3 are fitted in the U-shaped groove of each frame member 22. The back erection piece, or leg 9, of the frame member 22 has plural through holes in the elongated direction thereof, for example, two through holes formed at positions, each shifted toward the end sides in the elongated direction from the center thereof Through the two through holes, screws 21 are inserted into the aligned through holes, opened in the reflection case 12, the light guiding panel 11, and the optical diffusion case 15 of the display body 1. For example, the screws are fastened together with nuts on the surface of the optical diffusion case 15. Thus, the upper and lower frame members 22, each having two through holes, are securely fastened to the display body 1 at the four through holes. Accordingly, the display body 1, including the reflection case 12, the light guiding panel 11 and the optical diffusion case 15, is securely fixed, together with frame members 22, using screws 21, without using fasteners such as metal fittings or adhesive agents.

The frame members 20 having an L-shaped cross section and disposed on the right and left ends of the display body 1 are formed of steel. In the present embodiment, the optical diffusion case 15 does not have flanges at the ends in its width direction. Accordingly, the frame member 22 is attached to the flanges 14 on both the ends in the width direction of the steel-made refection case 12, exposed to both the ends in the width direction of the optical diffusion case 15, by, for example, the magnet 23. That is, one erection piece of the frame member 20 is additionally formed to the magnet 23 previously mounted on the reflection case 12. Thus, the frame member 20 is post-mounted detachably to the display body 1. The other erection piece of each frame member 20 extending on the front surface covers the end in the width direction of the optical diffusion case 15 in the display body 1 and intersects vertically and continuously between the frame members 22. Thus, the frame member 20 maintains the effective illumination area of the optical diffusion case 15 and covers its ends of the optical diffusion case 15, thus being fixed for finishing.

The cover panel 3, formed of a transparent resin, such as acryl or polycarbonate, has wide vertical ends, each partially overlapped with the end of the frame member 20. Each end of the cover panel 3 is inserted in the acceptable space defined between the front surface of the optical diffusion case 15 and the front erection piece of the frame member 20. Thus, the cover panel 3 covers the effective illumination area of the optical diffusion case 15. Such a configuration allows the cover panel 3 to be detachably removed when it is slid in one width direction. Through the removal and reloading of the cover panel 3, a positive print film can be disposed on the front surface of the optical diffusion case 15 and, if necessary, can be replaced arbitrarily.

Cushion materials 31 are disposed partially or serially on the back surfaces at the ends in the width direction of the cover panel 3. The use of the resilient property of the cushion material 31, allows the detachable cover panel 3 to be maintained at its home position and to be removed easily. The acceptable space can be easily defined by attaching the frame member 20 with a magnet, with the cover panel 3 disposed previously.

In the display device (A) of the present embodiment, wall-mounting brackets 4 are disposed integrally or separately on the frame member 22. Using the wall-mounting brackets 4, the display device (A) can be installed on the wall surface of a building or on an outdoor signboard. In the present embodiment, the frame member 22 has a U-shaped cross section. A wall mounting bracket 4, in a S-shaped form, is attached on the back surface of the display device 1. The back erection piece 9 of the frame 22, the display device (A), and the front erection piece 27 of the wall-mounting bracket 4 are fastened together, using screws, which do not protrude from the back side. A capillary action prevention gap 41 is defined between the edge of the front erection piece 27 of the wall-mounting bracket 4 and the inner surface of the frame member 22.

The S-shaped wall-mounting brackets 4 are fastened together with four screws 21 used for fastening the display body 1 and the upper and lower frame members 22. Each mounting bracket 4 includes vertically extending front and back erection pieces 27, 29, or legs, joined by a horizontal piece 28. The front erection piece 27 is inserted into the gap 41 between the frame member 22 and the display body 1. The screw 21 penetrates from the frame member 22 to the display body 1 via the through hole in the front erection piece 27. The back erection piece 29 is spaced from the back surface of the display device (A). For example, the display device (A) is installed in such a way that the through holes accept hooks mounted on a wall surface of a building or on a signboard.

In the wall-mounting bracket 4, the length of the front erection piece 27 is set in such a way that the front erection piece 27 does not reach the upper or bottom wall of the upper or lower frame member 22, with the screw 21 being fixed. By doing so, the upper end of the front erection piece 27 does not contact the inner surface of the upper or lower frame member 22. This configuration can prevent rain water or other liquid from invading the display device (A) through the wall mounting bracket 4 due to capillary action, which may occur in the frame members 22, from further invading from the frame member to the display body 1. In this instance, an increased gap 41 can prevent the capillary action and can work as a storage space for storing conductive leads for LED light sources 18. A seat 5 overlaps with the lower frame member 22 to conveniently accept the lower ends of the display body 1 and the cover panel 3.

FIGS. 4 to 9 illustrate other embodiments, respectively. In the display device shown in FIGS. 4 to 9, one of the reflection case 12 and the optical diffusion case 15 has a U-shaped cross section and has upper and lower flanges. Moreover, the other of the cases 12 and 15 has a U-shaped cross section and has right and left flanges. LED light sources 18 are disposed on the upper and lower flanges or on the right and left flanges. In this embodiment, the reflection case 12 of the display body 1 has flanges 14 disposed on the right and left sides of the substrate 13. The optical diffusion case 15 has flanges 17 disposed on the upper and lower side of the substrate 16. The flanges 14 and 17 are shifted by ¼ circle, or 90 degrees, relative to each other and are fitted together to frame the periphery of the light guiding panel 11. Thus, the light guiding panel 11 is sandwiched between the cases 12 and 15.

The light diffusion case 15 is disposed in such a way that the upper and lower flanges 17 or one of them overlays the upper and lower ends of the light guiding panel 11. This configuration illuminates the upper and lower ends through the light guiding panel so that the brightness of the ends can be viewed externally via the flange 17. This design illuminates the periphery of the display device (A) strengthening the impression of the display device (A). For that reason, the flange 17 according to the present embodiment uses, for example, a transparent resin, which is not roughened, and is molded integrally with the optical diffusion case 15 or post-formed integrally with the case 15. In the case of an integral fabrication through the post mounting, a colored resin, which is colored with a pigment, may be used, if desired, so that colored light guided through the light guiding panel 11 can be viewed externally.

Figure 7:
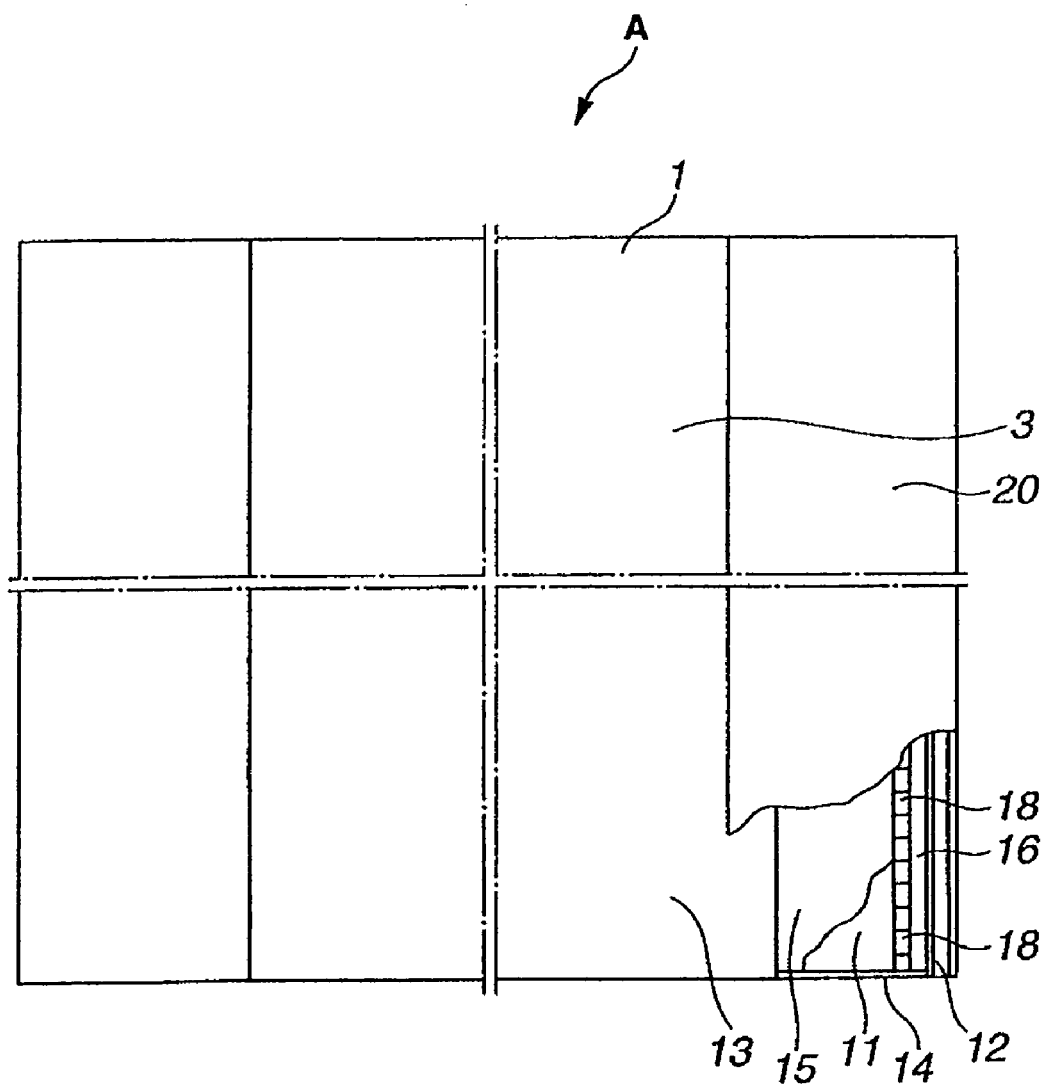
FIG. 7 is a front view illustrating the display device according to another embodiment.
Figure 8:
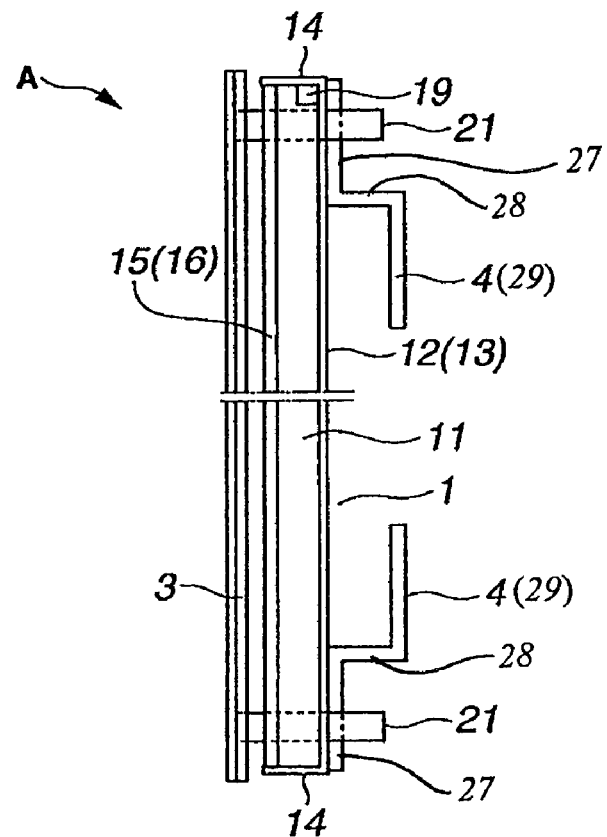
FIG. 8 is a vertical cross-sectional view illustrating the display device shown in FIG. 7.
Figure 9:
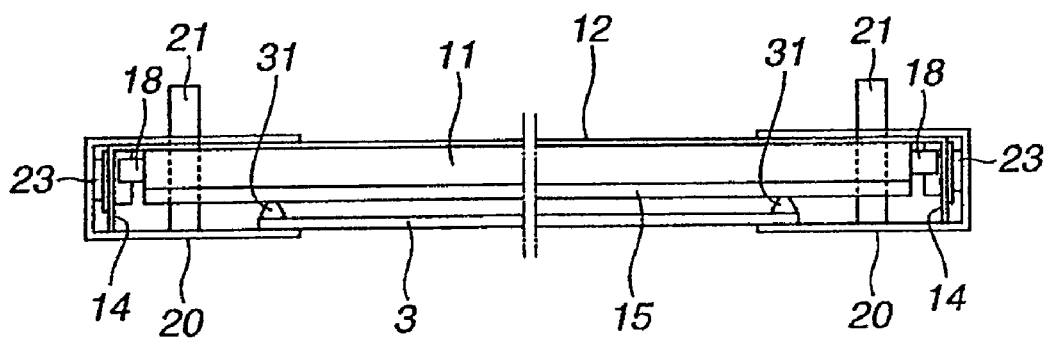
FIG. 9 is a horizontal cross-sectional view illustrating the display device shown in FIG. 8.

Referring to FIGS. 7 to 9, the display body 1 is fabricated as a flat panel where one of the reflection case 12 and the optical diffusion case 15 overlays the light guiding panel 11. The other of them houses the flat panel and the light guiding panel 11. The LED light sources 18 are disposed on the flanges. In the present embodiment, the reflection case 12 is a box-like case, similar to that shown in the foregoing embodiment. The optical diffusion case is formed as an optical diffusion flat panel 15. To construct the display body 1, the box-like reflection case 12 houses the optical diffusion flat panel 15 and the light guiding panel 11.

In the light guiding panel 11, a step or groove is formed in the end surface, which does not receive light, that is, in the upper reflection end surface, in this embodiment. The step or groove can arbitrarily store conduction leads for LED light sources 18. In the present embodiment, by cutting away the rear side of the end surface in an L-shaped form, a step is formed in the upper reflection end surface of the light guiding panel 11. The step can be used as the storage 19 that stores the conduction lead for connecting the power supply to the LED light source 18.

Moreover, in the present embodiment, the frame members 20, each having a U-shaped cross section, are securely capped onto the ends in the width direction of the display body 1. The upper and lower ends of the reflection case 12 are exposed so that frame members to be disposed on the upper and lower ends are omitted. The remaining elements are similar to those in the above-mentioned embodiments and the same reference numerals are attached to them. Hence, duplicate explanation will be omitted here.

The displays (A) according to the above-mentioned embodiments are designed to image its thoroughly thinned and flattened external appearance. The display devices (A) can be used, for example, for wall-mounted display devices and enable high intensity back lighting.

Illustrated embodiments have been explained above. However, the present invention can be embodied in various modes, without departing from the subject matter of the present invention. That is, various modes are made to concrete shapes, structures, or substances of display devices, display bodies, reflection cases, optical diffusion cases, light guiding panels, LED light sources, display bodies, frame members, cover panels, or wall mounting brackets, used on as-needed basis, relationships between them, and additions to them. Specifically, the reflection case and the optical diffusion case may be made in box-like form. The optical diffusion case may contain the light guiding panel and the LED light source and be fitted in the reflection case. The reflection case or frame member may be formed of aluminum or synthetic resin, in place of steel. Suitable fastener means, such as screws, snap-in latching, or slide fitting, may be used in place of magnet fastening. A sliding groove may be formed in the upper and lower members or in the right and left frame members. The cover panel may be mounted detachably to the sliding groove. A groove formed in non-incident end surface of the light guiding panel may store the conduction leads for the LED light source. A lead storage space may be disposed adjacent to the non-incident end surface of the light guiding panel in the light guiding panel storage case. The display device may be fabricated as a desktop display device.

The invention claimed is:

1. A display device, comprising,
a display body including a reflection case and an optical diffusion case, fitted to each other, a light guiding panel sandwiched between said reflection case and said optical diffusion case, and a LED light source disposed on a flange of one of said cases, which confronts a light incident end surface of said light guiding panel;
frame members disposed so as to fit on one or both of opposed ends of said display body; and
a front cover panel disposed detachably, for covering the illumination surface of said optical diffusion case between said frame members,
wherein said frame member has a U-shaped cross section defined by a back leg and a front leg joined by a horizontal piece, a S-shaped wall mounting bracket is disposed on the back surface of said display body, said back leg of said frame member and a front leg of said wall-mounting bracket are fastened together with screws through the back leg of said frame member, said screws not protruding through the front leg of said frame member.

2. The display device defined in claim 1, wherein one of said reflection case and said optical diffusion case of said display body comprises a box-like case which has flanges respectively formed at both opposed ends of a substrate and wherein the other of said reflection case and said optical diffusion case has a U-shaped cross section and has flanges formed at one of the opposed ends of a substrate.

3. The display device defined in claim 1, wherein one of said reflection case and said optical diffusion case of said display body has upper and lower flanges, each having a U-shaped cross section, wherein the other of said reflection case and said optical diffusion case has right and left flanges; and wherein said LED light source is disposed on at least one of said flanges.

4. The display device defined in claim 1, wherein one of said reflection case and said optical diffusion case of said display body is fitted on said light guiding panel to form a flat panel, and wherein the other of said reflection case and said optical diffusion case houses said flat panel and has said flange on which said LED light source is disposed.

5. The display device defined in claim 1, wherein said frame member is disposed adjacent to at least one of the opposed ends of said display body.

6. The display device defined in claim 1, wherein said front cover panel is inserted between the back surface of said frame member and the illumination surface of said optical diffusion case and is detachable between said frame members vertically or horizontally.

7. The display device defined in claim 1, wherein a step or groove is formed in a non-light incident end surface of said light guiding panel and stores conductive leads for said LED light source.

8. The display device defined in claim 1, wherein a storage space for storing conductive leads for said LED light source is formed near to a non-light incident end surface of said light guiding panel in said light guiding panel housing case.

9. The display device defined in claim 1, wherein said wall-mounting bracket is disposed integrally or separately on said frame member.

10. The display device defined in claim 1, wherein a gap for capillary action prevention is defined between a front leg of said wall-mounting bracket and an inner surface of said frame member.

* * * * *